US008694775B2

(12) United States Patent
Hui et al.

(10) Patent No.: US 8,694,775 B2
(45) Date of Patent: Apr. 8, 2014

(54) METHOD ENABLING REAL-TIME DATA SERVICE, REALIZATION, REAL-TIME DATA SERVICE SYSTEM AND MOBILE TERMINAL

(75) Inventors: Yi Hui, Shenzhen (CN); Xiaobing Ling, Shenzhen (CN)

(73) Assignee: ZTE Corporation, Shenzhen (CN)

(*) Notice: Subject to any disclaimer, the term of this patent is extended or adjusted under 35 U.S.C. 154(b) by 258 days.

(21) Appl. No.: 13/259,011

(22) PCT Filed: Dec. 25, 2009

(86) PCT No.: PCT/CN2009/076036
§ 371 (c)(1),
(2), (4) Date: Nov. 9, 2011

(87) PCT Pub. No.: WO2010/130140
PCT Pub. Date: Nov. 18, 2010

(65) Prior Publication Data
US 2012/0072719 A1    Mar. 22, 2012

(30) Foreign Application Priority Data

May 12, 2009 (CN) .......................... 2009 1 0138631

(51) Int. Cl.
*H04L 29/06* (2006.01)
*H04K 1/00* (2006.01)
(52) U.S. Cl.
USPC ........................... 713/160; 380/270; 713/150
(58) Field of Classification Search
USPC ................. 713/150–153, 160–161, 168, 170; 380/255–257, 259–263, 270–273
See application file for complete search history.

(56) References Cited

U.S. PATENT DOCUMENTS 7,039,938 B2    5/2006 Candelore
7,124,303 B2    10/2006 Candelore et al.
(Continued)

FOREIGN PATENT DOCUMENTS

CN         1633809 A      6/2005
CN       101562813 A     10/2009
WO      2009/078103      * 12/2007 ................ H04L 9/36

OTHER PUBLICATIONS

International Search Report in international application No. PCT/CN2009/076036, mailed on Apr. 8, 2010.
(Continued)

*Primary Examiner* — Darren B Schwartz
(74) *Attorney, Agent, or Firm* — Oppedahl Patent Law Firm LLC

(57) ABSTRACT

The present invention discloses a method for implementing a real-time data service, a real-time data service system and a mobile terminal. Said method for implementing a real-time data service includes the following steps: before encapsulating a Media Access Control Protocol Data Unit (MPDU), a Wireless Local Area Network Privacy Infrastructure (WPI) module in an Access Point (AP) needs to determine the type of the data to be encapsulated in the MPDU; if the data is a control signalling message of a real-time data service, the WPI module encrypts said data, then encapsulates the encrypted data in a data (e.g. PDU) field of the MPDU, and transmits the encapsulated data to the mobile terminal; if the data is an audio/video data message of a real-time data service, the data is not to be encrypted, but is encapsulated directly into the data (e.g. PDU) field of the MPDU in plaintext, and then transmitted to the mobile terminal. The present invention can reduce the processing load and the software and hardware costs of the AP and the mobile terminal.

4 Claims, 4 Drawing Sheets

(56) References Cited

U.S. PATENT DOCUMENTS

| | | |
|---|---|---|
| 7,155,012 B2 | 12/2006 | Candelore et al. |
| 7,233,669 B2 | 6/2007 | Candelore |
| 7,287,168 B2 | 10/2007 | Candelore et al. |
| 7,292,690 B2 | 11/2007 | Candelore et al. |
| 7,292,691 B2 | 11/2007 | Candelore et al. |
| 7,302,059 B2 | 11/2007 | Candelore et al. |
| 7,350,082 B2 | 3/2008 | Candelore et al. |
| 7,376,233 B2 | 5/2008 | Candelore et al. |
| 7,639,804 B2 | 12/2009 | Candelore et al. |
| 8,175,015 B1* | 5/2012 | Chowdhuri et al. .......... 370/300 |
| 2002/0009199 A1* | 1/2002 | Ala-Laurila et al. .......... 380/247 |
| 2003/0081776 A1 | 5/2003 | Candelore |
| 2003/0123664 A1 | 7/2003 | Pedlow, Jr. et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0174837 A1 | 9/2003 | Candelore et al. |
| 2004/0049688 A1 | 3/2004 | Candelore et al. |
| 2005/0028193 A1 | 2/2005 | Candelore |
| 2005/0223111 A1* | 10/2005 | Bhandaru et al. ............. 709/236 |
| 2006/0262926 A1* | 11/2006 | Candelore et al. ............ 380/200 |
| 2006/0269060 A1 | 11/2006 | Candelore et al. |
| 2007/0098166 A1 | 5/2007 | Candelore et al. |
| 2007/0160210 A1 | 7/2007 | Candelore et al. |
| 2007/0180276 A1* | 8/2007 | Everett et al. ................. 713/194 |
| 2007/0204146 A1 | 8/2007 | Pedlow, Jr. et al. |
| 2007/0242635 A1* | 10/2007 | Schaap ........................ 370/328 |
| 2007/0269046 A1 | 11/2007 | Candelore et al. |
| 2007/0271470 A9 | 11/2007 | Candelore et al. |
| 2007/0291940 A1 | 12/2007 | Candelore et al. |
| 2007/0291942 A1 | 12/2007 | Candelore et al. |
| 2008/0137847 A1 | 6/2008 | Candelore et al. |
| 2008/0159531 A1 | 7/2008 | Candelore et al. |
| 2008/0165968 A1* | 7/2008 | Yadav et al. .................. 380/270 |
| 2009/0022165 A1 | 1/2009 | Candelore et al. |
| 2009/0150737 A1* | 6/2009 | Wang et al. ................... 714/748 |
| 2009/0327716 A1* | 12/2009 | Raju et al. ..................... 713/168 |
| 2010/0020811 A1 | 1/2010 | Candelore et al. |
| 2010/0027550 A1 | 2/2010 | Candelore et al. |
| 2010/0257355 A1* | 10/2010 | Shinozaki ..................... 713/153 |
| 2011/0145561 A1* | 6/2011 | Anil .............................. 713/150 |

OTHER PUBLICATIONS

English Translation of the Written Opinion of the International Search Authority in international application No. PCT/CN2009/076036, mailed on Apr. 8, 2010.

Analysis of WAPI Protocol and Design of Mobile Terminal Oct. 2008.

* cited by examiner

METHOD ENABLING REAL-TIME DATA SERVICE, REALIZATION, REAL-TIME DATA SERVICE SYSTEM AND MOBILE TERMINAL

TECHNICAL FIELD

The present invention relates to the field of communications, in particular to a method for implementing a real-time data service, a real-time data service system and a mobile terminal.

BACKGROUND

With the maturity of 3G networks and the improvement of mobile terminals in performance, it is possible to perform a real-time data service by a mobile terminal. For example, users can watch mobile TV through a mobile TV client, and demand an audio/video program or watch an audio/video live program through a mobile-terminal streaming media client. The development of the real-time data service will effectively improve the user experience on 3G mobile terminals, and the operation based on the real-time data service will become a hotspot and focus of the 3G operators.

The real-time data service includes: mobile TV, video on demand, live video and so on. After deploying a real-time data service server in a Wireless Local Area Network (WLAN), a user can access the real-time data service server through a real-time data service client on a mobile terminal, obtain a real-time service data stream, and experience the real-time data service, such as mobile TV program browsing, video on demand and live video.

Due to the low security of the WLAN, it is necessary to resort to some WLAN authentication and protection protocols to improve the security of the real-time data service, so as to protect legal mobile terminals to use the real-time data service in security and with high quality and to prevent the access of illegal mobile terminals to the real-time data service server. A WLAN Authentication and Privacy Infrastructure (WAPI) protocol is indeed an optimum choice.

The WAPI is a WLAN security solution provided by the Chinese Wireless Local Area Network National Standard GB15629.11 after being demonstrated time and again by multiple parties in consideration of various application modes, aiming at the security issue of the Wired Equivalent Privacy (WEP) and other protocols in the IEEE802.11.

The WAPI protocol performs access authentication on a mobile terminal and key negotiation mainly through the certificate authentication and key negotiation prescribed in a WLAN Authentication Infrastructure (WAI) protocol, and completes encrypted transmission of data in a Media Access Control (MAC) layer through the encryption and decryption prescribed in a WLAN Privacy Infrastructure (WPI) protocol, to guarantee that a legal mobile terminal can securely access the real-time data service server.

FIG. 1 shows a flowchart of a method for implementing a real-time data service based on a wireless local area network in the prior art, the method comprises the following steps:

Step 101: an interaction is performed among a mobile terminal, an Access Point (AP) and an authentication server of a real-time data service system according to the WAI protocol, to complete bidirectional certificate authentication between the mobile terminal and the AP.

In the certificate authentication, the mobile terminal and the AP can negotiate to obtain a Base Key (BK).

Step 102: the mobile terminal and the AP complete the negotiation of a session key by using the base key and obtain a session key, such as a unicast session key and a multicast key therebetween.

Wherein the base key used in this step can be the one obtained by the negotiation in the step 101, or a base key educed by the mobile terminal and the AP based on a Pre-Shared Key (PSK).

After completing the certificate authentication and the session key negotiation in the WAI protocol, the AP opens a control port to allow the mobile terminal to interact with a real-time data service server of the real-time data service system.

Step 103: the mobile terminal interacts with the real-time data service server to complete transmission of real-time data service control signalling.

In this process, the mobile terminal and the AP perform encrypted transmission of a control signalling message by using the unicast session key obtained through the negotiation in the step 102, and the control signalling message can be transmitted between the AP and the real-time data service server in plaintext or in other secure ways because of the quite secure communication link therebetween.

Wherein the main functions of the control signalling include: negotiating real-time data service parameters, setting up an audio/video transmission channel, starting/controlling transmission of audio/video data of the real-time data service, etc., for example:

103a: the mobile terminal sends Describe Request (e.g. a paging request) signalling to the real-time data service server through the AP to send a media parameter supported by the mobile terminal to the real-time data service server; the real-time data service server sends Describe Response (e.g. a paging response) signalling to the mobile terminal through the AP to send a media parameter selected by the real-time data service server to the mobile terminal; and the mobile terminal and the real-time data service server complete negotiation on the media parameter of the real-time data service through the signalling interaction;

103b: the mobile terminal sends audio/video transmission channel Setup Request signalling to the real-time data service server through the AP; the real-time data service server sends audio/video transmission channel Setup Response signalling to the mobile terminal through the AP; and the audio/video transmission channel is set up between the mobile terminal and the real-time data service server through the signalling interaction;

103c: the mobile terminal sends audio/video data playing control signalling (such as Play, Pause and Stop, etc.) to the real-time data service server through the AP, so as to start, pause and stop the transmission of audio/video data.

Step 104: the real-time data service server sends the audio/video data to the mobile terminal through the AP.

Also, in this process, audio/video data messages can be transmitted in plaintext or in other secure ways between the AP and real-time data service server, but the transmission of audio/video data messages between the AP and mobile terminal is encrypted through the unicast session key or multicast key obtained by the negotiation in the step 102.

It should be noted that, in the process of transmitting the audio/video data messages from the real-time data service server to the mobile terminal, control signalling messages could be transmitted at any time between them, but audio/video data and control signalling would not be transmitted via the same message, i.e., the audio/video data and the control signalling would be transmitted in different logic channels.

It can be seen from the description above that it is able to greatly enhance safety of a real-time data service system which is based on the wireless local area network, after introducing the WAIP protocol into the real-time data service system. However, the method above has the following defects:

1) due to a quite large quantity of audio/video data to be transmitted by the real-time data service, the AP needs to encrypt the audio/video data and transmit the encrypted data to the mobile terminal after receiving it from the real-time data service server, which largely increases the processing load of the AP; and the service quality of the AP would be greatly influenced especially when the AP needs to provide the real-time data service data for multiple mobile terminals at the same time;

2) also, the mobile terminal can play the received audio/video data well only after decrypting them, and the decryption of the large quantity of audio/video data through a decryption algorithm which is prescribed in the WPI protocol also requires a higher processing capacity of hardware and software of the mobile terminal; and 3) the audio/video data of some real-time data services is scrambled data already, so a waste is caused when the audio/video data is encrypted by an encryption algorithm prescribed in the WPI.

SUMMARY

The technical problem to be solved by the present invention is to overcome the defects of the prior art and to provide a method for implementing a real-time data service, a real-time data service system and a mobile terminal, thereby reducing the processing load and the software and hardware costs of the AP and the mobile terminal.

To achieve the objective above, a technical solution of the present invention is realized as follows.

The present invention provides a method for implementing a real-time data service, comprising:

interacting with an Access Point (AP) and an authentication server in a real-time data service system and completing certificate authentication of a Wireless-Local-Area-Network Authentication Infrastructure (WAI) protocol, then negotiating with the AP to obtain a session key K by a mobile terminal;

exchanging a control signalling message of the real-time data service between the mobile terminal and a real-time data service server of the real-time data service system through the AP, to start and control the real-time data service; and sending the audio/video data message of the real-time data service from the real-time data service server to the mobile terminal through the AP after the real-time data service is started;

wherein the control signalling message is encapsulated into a Media Access Control Protocol Data Unit (MPDU) after being encrypted through the session key K, and then transmitted between the mobile terminal and the AP; at least one audio/video data message is encapsulated into the MPDU in plaintext and sent to the mobile terminal by the AP.

Further, the MPDU sent to the mobile terminal by the AP may comprise a plaintext transmission identifier which is used for indicating whether the audio/video data message in the MPDU is encapsulated in plaintext.

Further, n1 bits in a reserved field of the MPDU may be used as the plaintext transmission identifier; or n2 bits from the second bit to the eighth bit in a session key index field of the MPDU may be used as the plaintext transmission identifier;

wherein $1 \leq n1 \leq 8$, $1 \leq n2 \leq 7$.

Further, a packet number field of the MPDU may be used as the plaintext transmission identifier; when a value of the plaintext transmission identifier is an even number, it means that the audio/video data message is encapsulated into the MPDU in plaintext; when a value of the plaintext transmission identifier is an odd number, it means that the audio/video data message is encapsulated into the MPDU by encryption.

The present invention further provides a real-time data service system, adapted to provide a real-time data service for a mobile terminal; the system comprises: an AP, an authentication server and a real-time data service server; said AP being equipped with a first WAI unit and a first WLAN Privacy Infrastructure (WPI) unit;

wherein the first WAI unit is adapted to interact with the mobile terminal and the authentication server, complete certificate authentication in a WAI protocol and negotiate with the mobile terminal to obtain a session key K;

the first WPI unit is adapted to transmit a control signalling message for starting and controlling the real-time data service between the mobile terminal and the real-time data service server, and send an audio/video data message of the real-time data service sent by the real-time data service server to the mobile terminal after the real-time data service is started;

wherein the control signalling message is encapsulated into the MPDU after being encrypted through the session key K, and then transmitted between the first WPI unit and the mobile terminal; and at least one audio/video data message is encapsulated into the MPDU in plaintext and sent to the mobile terminal by the first WPI unit.

Further, the first WPI unit may be further adapted to set a plaintext transmission identifier in the MPDU to be sent to the mobile terminal, for indicating whether the audio/video data message in the MPDU is encapsulated in plaintext.

Further, the first WPI unit may be further adapted to use n1 bits in a reserved field of the MPDU sent by the first WPI unit as the plaintext transmission identifier; or the first WPI unit may be further adapted to use n2 bits from the second bit to the eighth bit in a session key index field of the MPDU sent by the first WPI unit as the plaintext transmission identifier;

wherein $1 \leq n1 \leq 8$, $1 \leq n2 \leq 7$.

Further, the first WPI unit may be further adapted to use a packet number field of the MPDU sent by the first WPI unit as the plaintext transmission identifier; when a value of the plaintext transmission identifier is an even number, it means that the audio/video data message is encapsulated into the MPDU in plaintext; when a value of the plaintext transmission identifier is an odd number, it means that the audio/video data message is encapsulated into the MPDU by encryption.

The present invention further provides a mobile terminal which is equipped with a second WAI unit, a second WPI unit and a real-time data service application unit; wherein the second WAI unit is adapted to interact with an AP and an authentication server in a real-time data service system, to complete certificate authentication in a WAI protocol, and to negotiate with the AP to obtain a session key K;

the real-time data service application unit is adapted to send a control signalling message for starting and controlling a real-time data service to a real-time data service server of the real-time data service system through the second WPI unit, and receive a control signalling message from the real-time data service server; and the real-time data service application unit is adapted to receive, after the real-time data service is started, an audio/video data message of the real-time data service sent by the real-time data service server through the second WPI unit, and play audio/video data encapsulated in the message; and the second WPI unit is adapted to receive a control signalling message sent by the real-time data service application unit, encrypt the control signalling message by using the session key K and encapsulate the encrypted control signalling message into an MPDU, and then send the encapsulated control signalling message to the real-time data service server through the AP; and the second WPI unit is adapted to use, after receiving the control signalling message which is encrypted and encapsulated into the MPDU and sent by the real-time data service server through the AP, the session key K to decrypt control signalling message, and send the decrypted control signalling message to the real-time data service application unit.

The second WPI unit may be further adapted to receive, from the AP, the audio/video data message which is encapsulated into the MPDU and sent by the real-time data service server, and determine whether the audio/video data message is encapsulated into the MPDU in plaintext; if encapsulated in plaintext, extracting the audio/video data message from the MPDU and sending it to the real-time data service application unit; if not, using the session key K to decrypt the audio/video data message in the MPDU, and sending the decrypted audio/video data message to the real-time data service application unit.

The second WPI unit may be further adapted to determine whether the audio/video data message is encapsulated in plaintext according to a plaintext transmission identifier included in the received MPDU.

To sum up, after a mobile terminal adopts the WAI protocol to access the real-time data service system, the AP of the real-time data service system encapsulates part of or all of audio/vide data messages of a real-time data service in the MPDU in plaintext and transmits them to the mobile terminal, the processing load of the AP and the mobile terminal for WPI encryption and decryption is reduced, the service quality of the AP is improved, and the software and hardware costs of the AP and the mobile terminal are reduced.

DETAILED DESCRIPTION

The main idea of the present invention is that: before encapsulating a Media Access Control Protocol Data Unit (MPDU), a WPI module in an AP determines the type of data to be encapsulated into the MPDU; if the data is a control signalling message of a real-time data service, the WPI module encrypts the data and then encapsulates the encrypted data in a data (e.g. PDU, Protocol Data Unit) field of the MPDU, and transmits it to the mobile terminal; if the data is an audio/video data message of a real-time data service, the WPI module directly encapsulates it into the data (e.g. PDU) field of the MPDU in plaintext without encryption, and transmits it to the mobile terminal.

Figure 1:
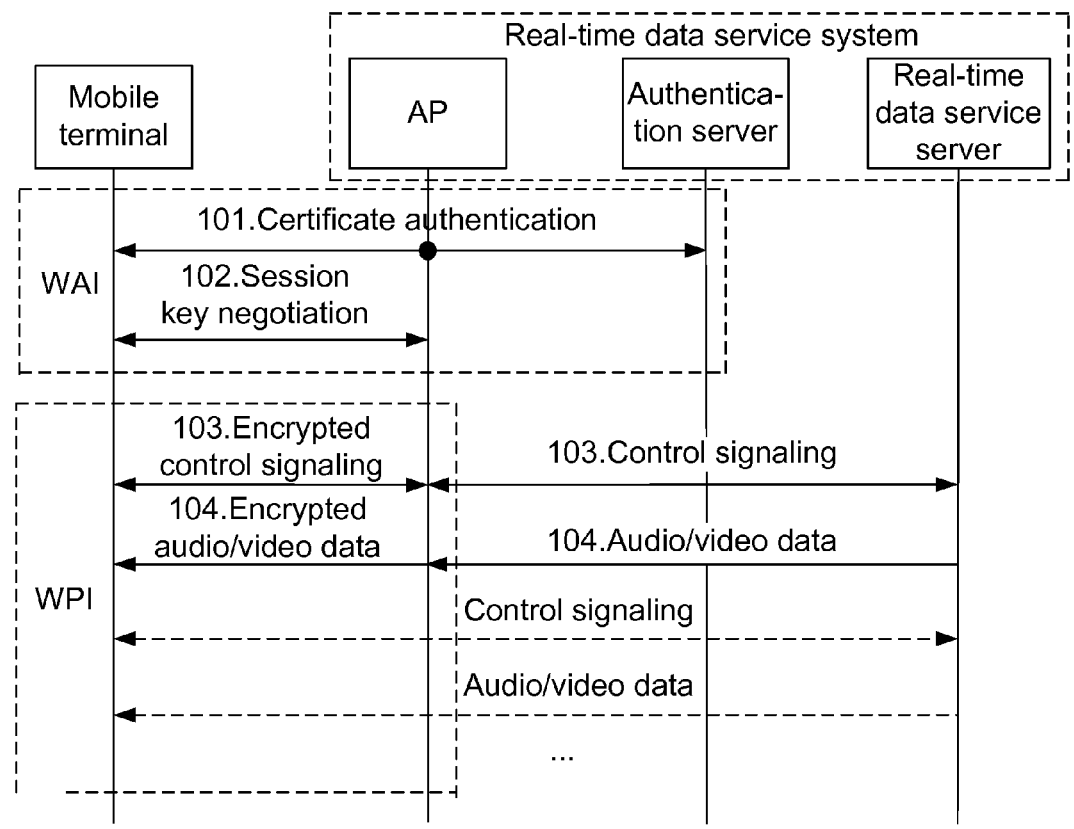
FIG. 1 shows a flowchart of a method for implementing a real-time data service based on a wireless local area network in the prior art.
Figure 2:
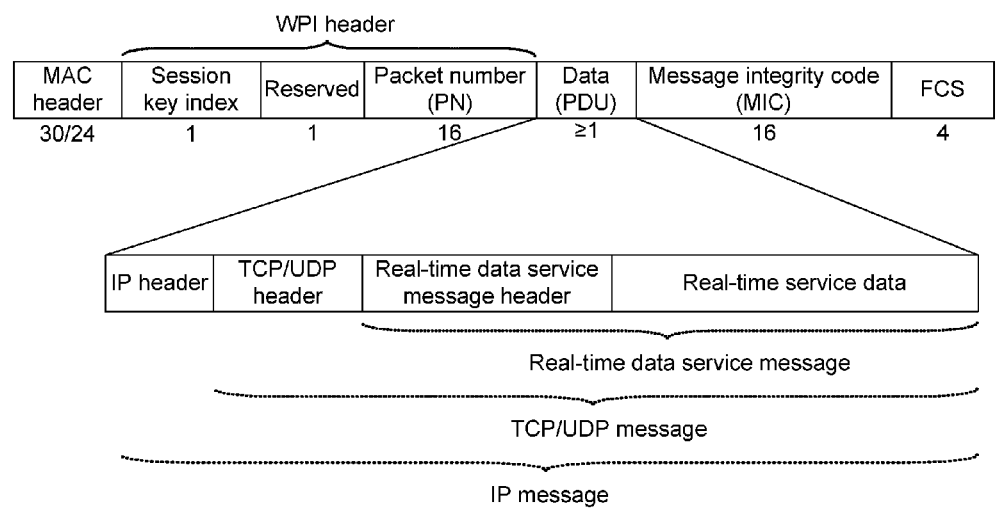
FIG. 2 shows a diagram of an MPDU encapsulation structure of the WPI.

An MPDU encapsulation structure of the WPI is as shown in FIG. 2, in which:

the length of an MAC header field is 24 bytes or 30 bytes;

the length of a session key index field is 1 byte, the session key index field shows the value of a Unicast Session Key Index (USKID), or the value of a Multicast Session Key Index (MSKID), or the value of a Station Key Index (STAKeyID), i.e., the session key index field shows an index of a session key used for encrypting this MPDU;

the length of a reserved field is 1 byte;

the length of a Packet Number (PN) field is 16 bytes, and the value of the field can be used as an Initial Vector (IV) for encrypting and decrypting data;

the PDU (e.g. data) field encapsulates MPDU data and has a maximum length of 2278 bytes, which encapsulates an upper level protocol data message, including an application layer protocol data message, such as a control signalling message and an audio/video data message of the real-time data service;

the length of a Message Integrity Code (MIC) field is 16 bytes;

the length of a FCS field is 4 bytes, and the FCS field is a frame check sequence in an MAC frame format.

In addition, FIG. 2 further shows a way for encapsulating a control signalling message and an audio/video data message of a real-time data service.

Both the Control signalling message and the audio/video data message of the real-time data service are called real-time data service messages and are composed of real-time data service message headers and real-time service data; the types of the real-time service data comprise: control signalling of the real-time data service and audio-video data of the real-time data service. The real-time data service message header includes the types of the real-time service data and other information.

The real-time data service message can be encapsulated into a Transfer Control Protocol (TCP) message or a User Datagram Protocol (UDP) message for transmission. A TCP header and a UDP header include a port number used by the real-time data service and other information.

The TCP message and the UDP message can be encapsulated into an Internet Protocol (IP) message for transmission. An IP header includes an IP address of the mobile terminal or the real-time data service server and other information.

It should be noted that, the encapsulation way for the control signalling message and the audio/video data message of the real-time data service in the PDU field as shown in FIG. 2 is only an example, other ways also can be used for the encapsulation.

The present invention is described in detail below with reference to the accompanying drawings and embodiments.

Figure 3:
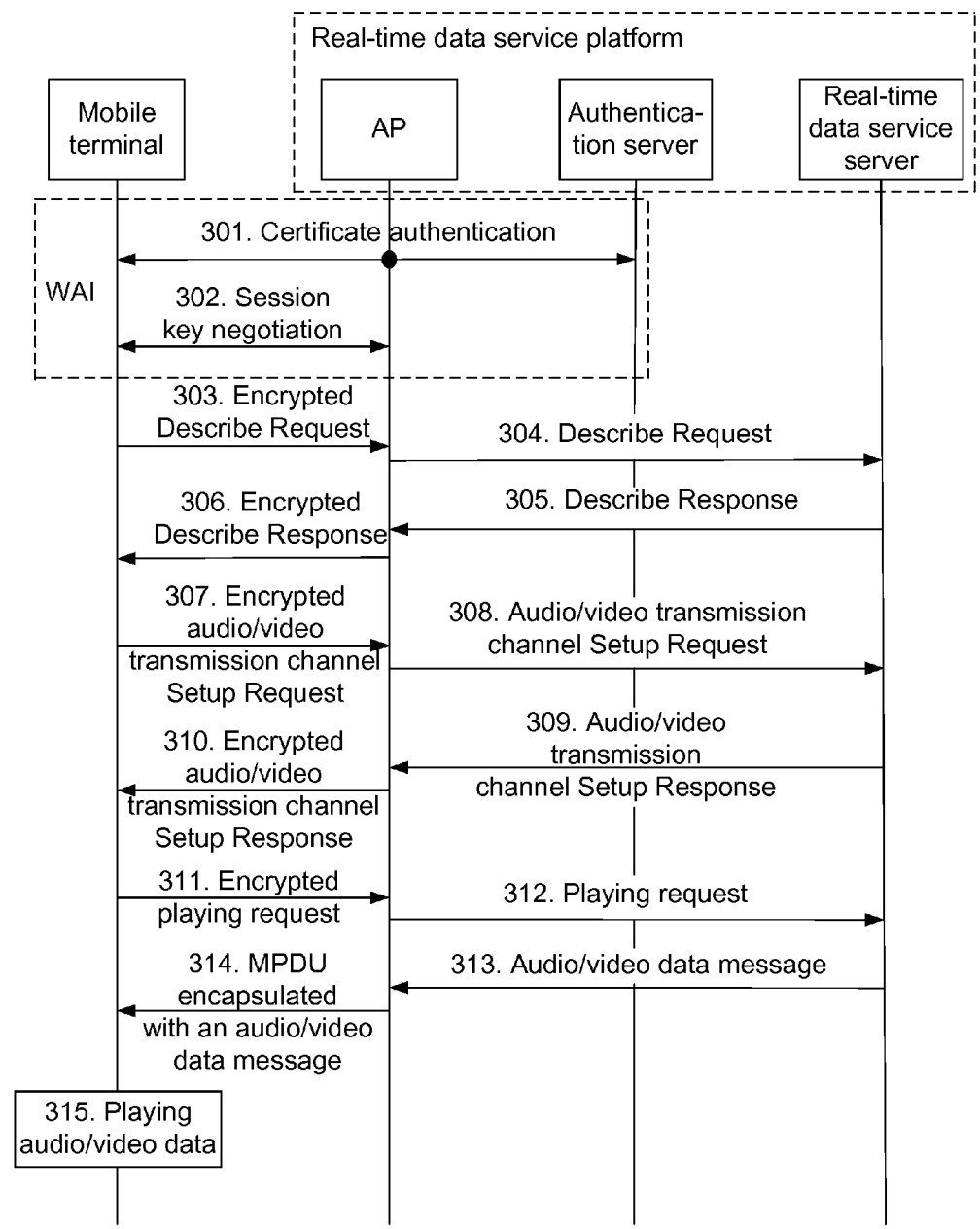
FIG. 3 shows a flowchart of a method for implementing a real-time data service based on a wireless local area network according to an embodiment of the present invention.

FIG. 3 shows a flowchart of a method for implementing a real-time data service based on a wireless local area network according to an embodiment of the present invention, the method comprises the following steps:

Step 301: interaction is carried out among a mobile terminal, an AP and an authentication server of a real-time data service system according to the WAI protocol, to complete bidirectional certificate authentication between the mobile terminal and the access point.

In the certificate authentication, the mobile terminal and the AP can negotiate to obtain a Base Key (BK).

Step 302: the mobile terminal and the AP complete negotiation on a session key by using the base key to obtain a session key, such as a unicast session key and a multicast key therebetween.

Wherein the base key used in this step can be the one obtained by the negotiation in the step 301, or a base key educed by the mobile terminal and the AP based on a Pre-Shared Key (PSK).

After completing the certificate authentication and the session key negotiation in the WAI protocol, the AP opens a control port to allow the mobile terminal to interact with a real-time data service server of the real-time data service system.

In the following steps (from step 303 to step 312), the mobile terminal interacts with the real-time data service server to perform transmission of control signalling of the real-time data service, so as to negotiate a media parameter of the real-time data service, build an audio/video transmission channel and then start up the real-time data service, wherein the transmission of the control signalling of the real-time data service between the mobile terminal and the AP is encrypted via the unicast session key, which is specifically realized as follows:

Step 303: after encrypting Describe Request signalling, the mobile terminal encapsulates the encrypted signalling into a PDU field of an MPDU and sends the encapsulated signalling to the AP.

The mobile terminal can use the unicast session key to encrypt the Describe Request signalling;

the Describe Request signalling includes a media parameter supported by the mobile terminal;

the method of using each field in the MPDU can refer to the WAPI protocol.

Step 304: after receiving the MPDU encapsulated with the Describe Request signalling, the AP uses a session key (it is the unicast session key in this embodiment) identified by a session key index field in the MPDU to decrypt the encrypted signalling in the PDU field, and sends the decrypted Describe Request signalling to the real-time data service server.

Step 305: after receiving the Describe Request signalling, the real-time data service server selects a media parameter according to the media parameter supported by the mobile terminal and local settings, and sends the selected media parameter included in Describe Response signalling to the AP.

Step 306: after receiving the Describe Response signalling, the AP uses the unicast session key to encrypt the Describe Response signalling, encapsulates the encrypted signalling into the PDU field of the MPDU, and then sends the encapsulated signalling to the mobile terminal.

After receiving the MPDU encapsulated with the Describe Response signalling, the mobile terminal uses the unicast session key to decrypt the encrypted Describe Response signalling in the PDU field, to obtain a media parameter supported by the real-time data service server and complete the negotiation on the media parameter of the real-time data service.

Step 307: after using the unicast session key to encrypt audio/video transmission channel Setup Request signalling, the mobile terminal encapsulates the encrypted signalling into the PDU field of the MPDU, and then send the encapsulated signalling to the AP.

Step 308: after receiving the MPDU encapsulated with the audio/video transmission channel Setup Request signalling, the AP uses the unicast session key to decrypt the encrypted signalling in the PDU field, and sends the decrypted audio/video transmission channel Setup Request signalling to the real-time data service server.

Step 309: after receiving the audio/video transmission channel Setup Request signalling, the real-time data service server sends audio/video transmission channel Setup Response signalling to the AP.

Step 310: after receiving the audio/video transmission channel Setup Response signalling, the AP uses the unicast session key to encrypt the signalling, and encapsulates the encrypted signalling into the PDU field of the MPDU, and then sends the encapsulated signalling to the mobile terminal.

After receiving the MPDU encapsulated with the audio/video transmission channel setup response signalling, the mobile terminal uses the unicast session key to decrypt the encrypted signalling in the PDU field, to obtain the audio/video transmission channel Setup Response signalling and complete the establishment of the audio/video transmission channel according to the parameters included in the signalling.

Step 311: after using the unicast session key to encrypt audio/video data playing control signalling (for example, playing request signalling), the mobile terminal encapsulates the encrypted signalling into the PDU field of the MPDU and then sends the encapsulated signalling to the AP.

Step 312: after receiving the MPDU encapsulated with the playing signalling, the AP uses the unicast session key to decrypt the encrypted signalling in the PDU field, and sends the decrypted playing request signalling to the real-time data service server.

Step 313: after receiving the playing request signalling, the real-time data service server sends an audio/video data message of the real-time data service to the mobile terminal through the AP.

Step 314: after receiving the audio/video data message sent from the real-time data service server to the mobile terminal, the AP encapsulates the audio/video data message in plaintext into the MPDU and then sends the encapsulated audio/video data messages to the mobile terminal.

To be convenient for the mobile terminal to recognize that the MPDU is transmitted in plaintext, the AP can set a plaintext transmission identifier in the MPDU sent to the mobile terminal in the following ways:

1) using n1 ($1 \leq n1 \leq 8$) bits in a reserved field of the MPDU as the plaintext transmission identifier, for example, setting the value of the plaintext transmission identifier with 1 means that the MPDU is transmitted in plaintext, and setting the value of the plaintext transmission identifier with 0 means that the transmission of the MPDU is encrypted;

2) using n2 ($1 \leq n2 \leq 7$) bits from bit 1 to bit 7 (i.e., from the second bit to the eighth bit, which are not used in the WAPI protocol) in the session key index field as the plaintext transmission identifier, when the value of the plaintext transmission identifier is more than 0, it means that the MPDU is transmitted in plaintext; when the value of the plaintext transmission identifier is 0, it means that the transmission of the MPDU is encrypted.

It should be noted that, bit 0 in the session key index field is the bit occupied by the USKID or the MSKID or the STAKeyID.

3) in addition to setting the plaintext transmission identifier at above-mentioned locations, the plaintext transmission identifier can also be set in a PN field because the PN (Packet Number) field is not required to be used in the process of transmitting the MPDU in plaintext; when the value of the PN field is an even number, it means that the MPDU is transmitted in plaintext; when the value of the PN field is an odd number, it means that the transmission of the MPDU is encrypted (according to the provisions of the WAPI protocol, the value of the PN field is required to be an odd number when the value of the PN field is used as an IV in the encryption performed on the AP side).

Step 315: after receiving the MPDU encapsulated with the audio/video data message, the mobile terminal learns, according to the plaintext transmission identifier, that there is data which is transmitted in plaintext encapsulated in the MPDU, so the decryption is not needed; the mobile terminal plays the audio/video data encapsulated in the audio/video data message.

The mobile terminal can also determine whether the MPDU is transmitted in plaintext through parsing the format of data encapsulated in the PDU field, besides through the plaintext transmission identifier; for example, checking if the value of the IP header is correct, if not, then the IP header is deemed to be encrypted, thus further to be determined that the MPDU is not transmitted in plaintext.

it should be noted that, in the process of transmitting the audio/video data messages, the real-time data service server can send a control signalling message to the mobile terminal at any time, and the mobile terminal can receive the MPDU whose transmission is encrypted at any time, so the processing efficiency of the mobile terminal can be improved by using the plaintext transmission identifier to identify whether the transmission of the MPDU is plaintext transmission or encryption transmission.

According to the basic principle of the present invention, the embodiments above can be in various modes, for example:

according to the current load conditions, part of audio/video data messages can be encrypted, encapsulated into the MPDU and sent to the mobile terminal by the AP via encrypted transmission, whereas the other part of audio/video data messages can be encapsulated into the MPDU and sent to the mobile terminal by the AP via plaintext transmission.

Figure 4:
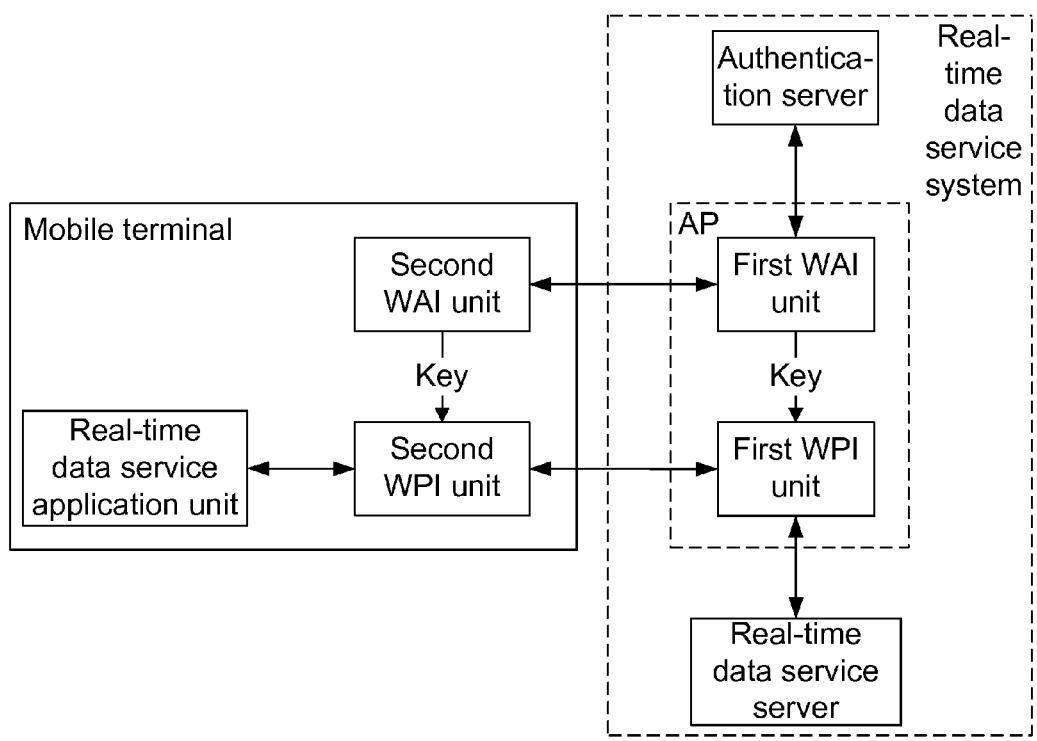
FIG. 4 shows a structural diagram of a real-time data service system according to an embodiment of the present invention.

FIG. 4 shows a structural diagram of a real-time data service system according to an embodiment of the present invention; the system is used for providing a real-time data service for a mobile terminal. As shown in FIG. 4, the system comprises: an AP, an authentication server and a real-time data service server, wherein:

the AP is equipped with a first WAI unit and a first WPI unit;

the first WAI unit is adapted to interact with the mobile terminal and the authentication server, complete certificate authentication in the WAI protocol and negotiate with the mobile terminal to obtain a session key K;

the first WPI unit is adapted to transmit a control signalling message for starting and controlling a real-time data service between the mobile terminal and the real-time data service server, and send an audio/video data message of the real-time data service sent by the real-time data service server to the mobile terminal after the real-time data service is started;

wherein the control signalling message is encapsulated into the MPDU after being encrypted through the session key K and then transmitted between the first WPI unit and the mobile terminal; and at least one audio/video data message is encapsulated into the MPDU in plaintext and sent to the mobile terminal by the first WPI.

The first WPI unit is further adapted to set a plaintext transmission identifier in the MPDU to be sent to the mobile terminal, for indicating whether the audio/video data message in the MPDU is encapsulated in plaintext.

The first WPI unit is further adapted to use n1 bits in a reserved field of the MPDU sent by the first WPI unit as the plaintext transmission identifier; or the first WPI unit is further adapted to use n2 bits from the second bit to the eighth bit in a session key index field of the MPDU sent by the first WPI unit as the plaintext transmission identifier;

wherein $1 \leq n1 \leq 8$, $1 \leq n2 \leq 7$.

The first WPI unit is further adapted to use a Packet Number field of the MPDU sent by the first WPI unit as the plaintext transmission identifier; when the value of the plaintext transmission identifier is an even number, it means that the audio/video data message is encapsulated in the MPDU in plaintext; when the value of the plaintext transmission identifier is an odd number, it means that the audio/video data message is encapsulated in the MPDU by encryption.

The mobile terminal is equipped with a second WAI unit, a second WPI unit and a real-time data service application unit;

the second WAI unit is adapted to interact with the AP and the authentication server in the real-time data service system, so as to complete certificate authentication in the WAI protocol, and to negotiate with the AP to obtain a session key K;

the real-time data service application unit is adapted to send a control signalling message for starting and controlling a real-time data service through the second WPI unit, and receive a control signalling message from the real time data service server; and the real-time data service application unit is adapted to receive, after the real-time data service is started, an audio/video data message of the real-time data service sent by the real-time data service server through the second WPI unit, and play audio/video data encapsulated in the message;

the second WPI unit is adapted to receive a control signalling message sent by the real-time data service application unit, encrypt the control signalling message by using the session key K and encapsulate the encrypted control signalling message into an MPDU, and send the encapsulated control signalling message to the real-time data service server through the AP; and after receiving the control signalling message which is encrypted and encapsulated into the MPDU and sent by the real-time data service server through the AP, the second WPI unit is adapted to use the session key K to decrypt the control signalling message, and send the decrypted control signalling message to the real-time data service application unit;

the second WPI unit is further adapted to receive from the AP the audio/video data message which is encapsulated in the MPDU and sent by the real-time data service server, and determine whether the audio/video data message is encapsulated in the MPDU in plaintext; if so, extracting the audio/video data message from the MPDU and sending it to the real-time data service application unit; if not, using the session key K to decrypt the audio/video data message in the MPDU, and sending the decrypted audio/video data message to the real-time data service application unit;

wherein the second WPI unit is further adapted to determine whether the audio/video data message is encapsulated in plaintext according to a plaintext transmission identifier included in the received MPDU.

To sum up, in the present invention, part of or all audio/video data messages of a real-time data service are encapsulated into an MPDU in plaintext and sent to a mobile terminal, therefore, the processing loads of an AP and the mobile terminal which are used for WPI encryption and decryption are reduced, the service quality of the AP is improved, and the software and hardware costs of the mobile terminal are reduced.

it should be noted that, the security of a real-time data service still can be guaranteed because a control signalling message of the real-time data service is encapsulated and transmitted in an encrypted state in the present invention, and unauthorized users cannot use/play audio/video data encapsulated in audio/video data messages due to lack of media parameters (for example, a decoding parameter) included in the control signalling message, even though they can receive all the audio/video data messages of the real-time data service.

The above are only the preferred embodiments of the present invention and not intended to limit the scope of protection of the present invention.

The invention claimed is:

1. A method for implementing a real-time data service, comprising:

interacting with an Access Point (AP) and an authentication server in a real-time data service system and completing certificate authentication in a Wireless-Local-Area-Network Authentication Infrastructure (WAI) protocol, then negotiating with the AP to obtain a session key K by a mobile terminal;

exchanging a control signaling message of the real-time data service between the mobile terminal and a real-time data service server of the real-time data service system through the AP, to start and control the real-time data service; and sending an audio/video data message of the real-time data service from the real-time data service server to the mobile terminal through the AP after the real-time data service is started;

wherein the control signaling message is encapsulated into a Media Access Control Protocol Data Unit (MPDU) after being encrypted through the session key K, and then transmitted between the mobile terminal and the AP; and at least one audio/video data message is encapsulated into the MPDU in plaintext and sent to the mobile terminal by the AP;

wherein the MPDU sent to the mobile terminal by the AP comprises a plaintext transmission identifier which is used for indicating whether the audio/video data message in the MPDU is encapsulated in plaintext;

wherein n1 bits in a reserved field of the MPDU are used as the plaintext transmission identifier; or n2 bits from a second bit to an eighth bit in a session key index field of the MPDU are used as the plaintext transmission identifier;

wherein $1 \leq n1 \leq 8$, $1 \leq n2 \leq 7$.

2. The method according to claim 1, wherein a packet number field of the MPDU is used as the plaintext transmission identifier;

when a value of the plaintext transmission identifier is an even number, the audio/video data message is encapsulated into the MPDU in plaintext; when a value of the plaintext transmission identifier is an odd number, the audio/video data message is encapsulated into the MPDU by encryption.

3. A real-time data service system, adapted to provide a real-time data service for a mobile terminal, comprising: an AP, an authentication server and a real-time data service server; said AP being equipped with a first WAI unit and a first WLAN Privacy Infrastructure (WPI) unit;

wherein the first WAI unit is adapted to interact with the mobile terminal and the authentication server, complete certificate authentication in a WAI protocol and negotiate with the mobile terminal to obtain a session key K;

the first WPI unit is adapted to transmit a control signaling message for starting and controlling the real-time data service between the mobile terminal and the real-time data service server, and send an audio/video data message of the real-time data service sent by the real-time data service server to the mobile terminal after the real-time data service is started;

wherein the control signaling message is encapsulated into the MPDU after being encrypted through the session key K, and then transmitted between the first WPI unit and the mobile terminal; and at least one audio/video data message is encapsulated into the MPDU in plaintext and sent to the mobile terminal by the first WPI unit;

wherein the first WPI unit is further adapted to set a plaintext transmission identifier in the MPDU to be sent to the mobile terminal, for indicating whether the audio/video data message in the MPDU is encapsulated in plaintext;

wherein the first WPI unit is further adapted to use n1 bits in a reserved field of the MPDU sent by the first WPI unit as the plaintext transmission identifier; or the first WPI unit is further adapted to use n2 bits from a second bit to an eighth bit in a session key index field of the MPDU sent by the first WPI unit as the plaintext transmission identifier;

wherein $1 \leq n1 \leq 8$, $1 \leq n2 \leq 7$.

4. The system according to claim 3, wherein the first WPI unit is further adapted to use a packet number field of the MPDU sent by the first WPI unit as the plaintext transmission identifier; when a value of the plaintext transmission identifier is an even number, the audio/video data message is encapsulated into the MPDU in plaintext; when a value of the plaintext transmission identifier is an odd number, the audio/video data message is encapsulated into the MPDU by encryption.

* * * * *

UNITED STATES PATENT AND TRADEMARK OFFICE
CERTIFICATE OF CORRECTION

PATENT NO. : 8,694,775 B2  Page 1 of 1
APPLICATION NO. : 13/259011
DATED : April 8, 2014
INVENTOR(S) : Hui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 259 days.

Signed and Sealed this
Twenty-ninth Day of September, 2015

Michelle K. Lee
*Director of the United States Patent and Trademark Office*